United States Patent
Nam

(10) Patent No.: US 9,228,529 B2
(45) Date of Patent: Jan. 5, 2016

(54) ENGINE PROTECTING APPARATUS FOR PREVENTING THE INFLOW OF MOISTURE

(75) Inventor: Chan-Ung Nam, Changwon-si (KR)

(73) Assignee: VOLVO CONSTRUCTION EQUIPMENT AB (SE)

(*) Notice: Subject to any disclaimer, the term of this patent is extended or adjusted under 35 U.S.C. 154(b) by 376 days.

(21) Appl. No.: 13/816,803

(22) PCT Filed: Aug. 17, 2010

(86) PCT No.: PCT/KR2010/005403
§ 371 (c)(1),
(2), (4) Date: Feb. 13, 2013

(87) PCT Pub. No.: WO2012/023638
PCT Pub. Date: Feb. 23, 2012

(65) Prior Publication Data
US 2013/0144506 A1    Jun. 6, 2013

(51) Int. Cl.
*F02D 45/00* (2006.01)
*F02D 31/00* (2006.01)
(Continued)

(52) U.S. Cl.
CPC .............. *F02D 45/00* (2013.01); *F02D 31/009* (2013.01); *F02D 41/0025* (2013.01);
(Continued)

(58) Field of Classification Search
CPC .................... F02D 41/0025; F02D 2200/0611; F02M 25/0225; F02M 25/0228; F02M 25/022
USPC ........ 701/102, 110, 112; 123/1 A, 25 R, 25 J, 123/25 M, 510, 525, 575
See application file for complete search history.

(56) References Cited

U.S. PATENT DOCUMENTS 4,328,825 A * 5/1982 Bishai ........................... 137/172
4,491,143 A * 1/1985 Yasuhara ....................... 137/172
(Continued)

FOREIGN PATENT DOCUMENTS

CN    101205858 A    6/2008
CN    201396218 Y    2/2010
(Continued)

OTHER PUBLICATIONS

State Intellectual Property Office (SIPO) of People's Republic of China Notification of First Office Action with English translation dated Feb. 28, 2015 (11 pages).

(Continued)

*Primary Examiner* — John Kwon
*Assistant Examiner* — Johnny H Hoang
(74) *Attorney, Agent, or Firm* — Harness, Dickey & Pierce, P.L.C.

(57) ABSTRACT

The present invention relates to an engine protecting apparatus for preventing the inflow of moisture, which drops the RPM (revolutions per minute) of an engine by generating an RPM drop request signal when moisture drain does not occur, wherein a time is counted from the point when a moisture detection signal is received from a WIF sensor installed in a moisture separator, and moisture drain is checked at the point when a counted cumulative time exceeds a set time. When moisture drain is not performed even after a signal for moisture drain is received from a moisture detecting sensor installed in the moisture separator, a driver is aware of the seriousness of moisture separation to thus separate moisture in the moisture separator as soon as possible. This prevents fatal damages which may be aroused in an injector or fuel system due to the introduction of moisture into an engine.

4 Claims, 3 Drawing Sheets

(51) Int. Cl.
*F02D 41/00* (2006.01)
*F02D 41/04* (2006.01)
*F02D 41/22* (2006.01)
*F02D 41/24* (2006.01)
*F02M 37/22* (2006.01)

(52) U.S. Cl.
CPC .............. *F02D 41/04* (2013.01); *F02D 41/22* (2013.01); *F02D 41/2403* (2013.01); *F02D 2200/0611* (2013.01); *F02M 37/221* (2013.01); *Y02T 10/40* (2013.01)

(56) References Cited

U.S. PATENT DOCUMENTS

| | | | |
|---|---|---|---|
| 4,637,351 | A | 1/1987 | Pakula |
| 5,156,114 | A | 10/1992 | Gunnerman |
| 6,354,256 | B1* | 3/2002 | Ohanian et al. .......... 123/179.21 |
| 7,453,271 | B2* | 11/2008 | Straub .......................... 324/694 |
| 2003/0168025 | A1* | 9/2003 | Lesniak ...................... 123/25 A |
| 2003/0222656 | A1* | 12/2003 | Phillips et al. ................. 324/605 |
| 2006/0065246 | A1 | 3/2006 | Zdroik |
| 2007/0144494 | A1* | 6/2007 | Mori et al. .................... 123/493 |

FOREIGN PATENT DOCUMENTS

| | | |
|---|---|---|
| JP | 09-273469 | 10/1997 |
| JP | 11-107782 A | 4/1999 |
| JP | 2009-121464 A | 6/2009 |
| KR | 10-0140975 B1 | 7/1998 |
| KR | 10-2007-0060474 A | 6/2007 |

OTHER PUBLICATIONS

International Search Report (in Korean and English) and Written Opinion (in Korean) for PCT/KR2010/005403, mailed May 3, 2011; ISA/KR.

International Preliminary Report on Patentability (Chapter II of the Patent Cooperation Treaty) for PCT/KR2010/005403 (in Korean) dated Nov. 15, 2012.

Office Action for Japanese Patent Application No. 2013-524763 dated Mar. 4, 2014.

* cited by examiner

ENGINE PROTECTING APPARATUS FOR PREVENTING THE INFLOW OF MOISTURE

FIELD OF THE INVENTION

The present invention relates to an engine protection apparatus for preventing inflow of water. More particularly, the present invention relates to an engine protection apparatus for preventing inflow of water, in which when the water drain does not occur although a signal for draining the water is received from a water detection sensor installed in a water separator, the engine RPM is automatically dropped to allow an operator recognizes the seriousness of the water separation and promptly separate the water in the water separator, so that a fatal damage which may be caused by the inflow of water into an engine in an injector or a fuel system can be prevented.

BACKGROUND OF THE INVENTION

Conventionally, when an operator does not drain water within a predetermined time period although a signal for draining the water is received from a water sensor installed in a water separator, water enters an engine, thus resulting in a fatal damage in the engine or an injector.

DETAILED DESCRIPTION OF THE INVENTION

Technical Problems

Accordingly, the present invention was made to solve the aforementioned problem occurring in the prior art, and it is an object of the present invention to provide an engine protection apparatus for preventing inflow of water, in which when the water drain does not occur although a signal for draining the water is received from a water detection sensor installed in a water separator, the engine RPM is automatically dropped to allow an operator recognizes the seriousness of the water separation and promptly separate the water in the water separator, thereby preventing a fatal damage which may be caused by the inflow of water into an engine in an injector or a fuel system.

Technical Solution

To accomplish the above object, in accordance with the present invention, there is provided an engine protection apparatus for preventing inflow of water, including: a time count unit configured to count time starting from the time point at which a water detection signal is received thereto from a WIF (Water In Fuel) sensor installed in a water separator; an RPM (Revolution Per Minute) drop request unit configured to check whether or not water drain occurs at the time point when the counted accumulated time period exceeds a preset time period, generate an RPM drop request signal if the water drain does not occur, and default the RPM drop request signal if the water drain occurs; and an engine RPM drop processing unit configured to drop the engine RPM in response to the generated RPM drop request signal.

Preferably, the dropping of the engine RPM is performed in such a manner that a reference drop RPM is matched to the current RPM to be dropped and is stored, and when the RPM drop request signal is applied to the engine RPM drop processing unit, the current RPM is dropped to the reference drop RPM that is matched to the current RPM.

In addition, whether or not the water drain occurs is checked for at least two time points where the counted accumulated time period exceeds the preset time period, and if no water drain occurs, the RPM drop request unit generates the RPM drop request signal.

Advantageous Effect

In accordance with the engine protection apparatus for preventing inflow of water of the present invention, time is counted starting from the time point at which a water detection signal is received from a WIF sensor installed in a water separator, whether or not water drain occurs is checked at the time point when the counted accumulated time period exceeds a preset time period, and if the water drain does not occur, an RPM drop request signal is generated to drop the engine RPM. Furthermore, if the water drain does not occur although a signal for draining the water is received from the water detection sensor installed in the water separator, an operator recognizes the seriousness of the water separation and promptly separates the water in the water separator, so that a fatal damage which may be caused by the inflow of water into an engine in an injector or a fuel system can be prevented.

BRIEF DESCRIPTION OF THE INVENTION

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

| 100: water separator | 101: WIF sensor |
|---|---|
| 200: V-ECU | 300: E-ECU |

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

Figure 1:
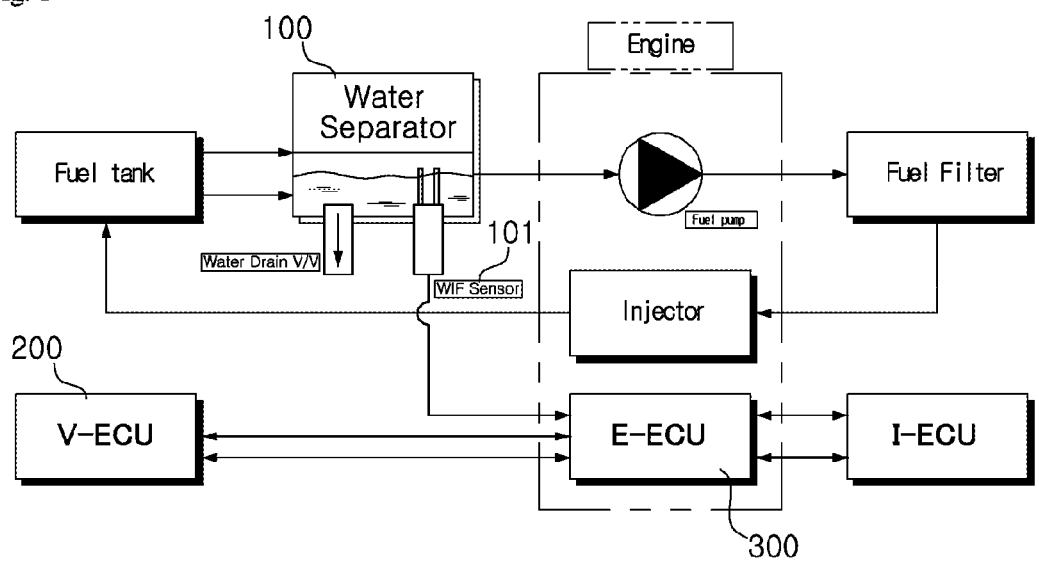
FIG. 1 is a block diagram showing the construction of an engine protection apparatus for preventing inflow of water in accordance with the present invention.

FIG. 1 is a block diagram showing the construction of an engine protection apparatus for preventing inflow of water in accordance with the present invention.

As shown in FIG. 1, the engine protection apparatus of the present invention includes a WIF (Water In Fuel) sensor 101 installed in a water separator 100, a V-ECU (Vehicle ECU) 200 including a time counting unit and an RPM (Revolution Per Minute) drop request unit which are built therein, and a E-ECU (Engine ECU) 300 including an engine RPM drop processing unit built therein.

The time counting unit built in the V-ECU 200 serves to receive a water detection signal generated from the WIF sensor 101 installed in the water separator 100 through the E-ECU 300, and count time starting from the time point at which the water detection signal is received by the time counting unit.

The RPM (Revolution Per Minute) drop request unit serves to check whether or not water drain occurs at the time point when the counted accumulated time period exceeds a preset time period, generate an RPM drop request signal for application to the E-ECU 300 if the water drain does not occur, and default the RPM drop request signal if the water drain occurs. Preferably, the RPM drop request unit may check whether or not the water drain occurs is checked for at least two time points (e.g., the primary and secondary time points) where the counted accumulated time period exceeds the preset time period, and may generate the RPM drop request signal if no water drain occurs.

The engine RPM drop processing unit built in the E-ECU 300 serves to drop the engine RPM in response to the generated RPM drop request signal. Preferably, the dropping of the engine RPM is performed in such a manner that a reference drop RPM is matched to the current RPM to be dropped and is stored, and when the RPM drop request signal is applied to the engine RPM drop processing unit, the current RPM is dropped to the reference drop RPM that is matched to the current RPM.

Figure 2:
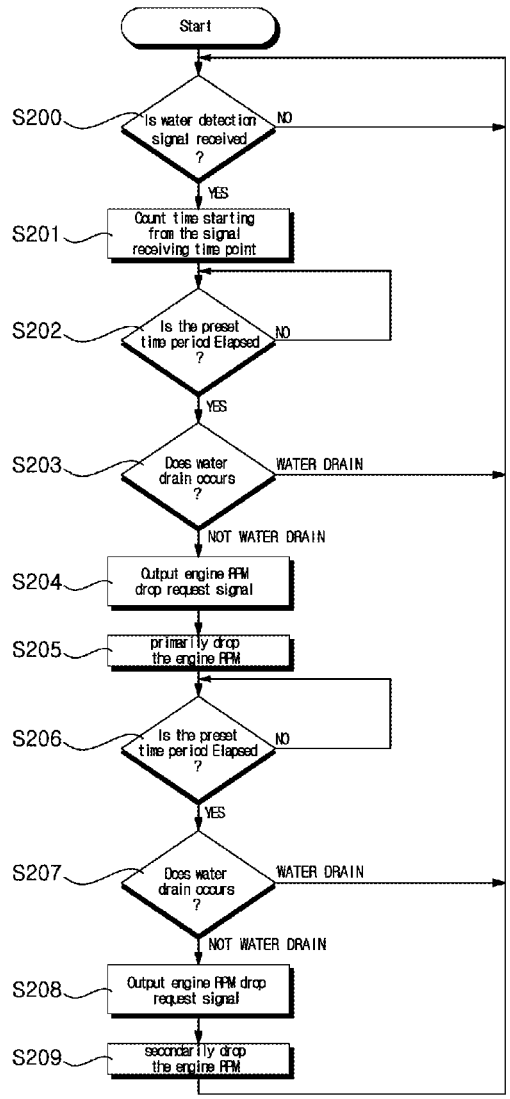
FIG. 2 is a flowchart sequentially showing the operation of an engine protection apparatus for preventing inflow of water in accordance with the present invention.

FIG. 2 is a flowchart sequentially showing the operation of an engine protection apparatus for preventing inflow of water in accordance with the present invention.

As shown in FIG. 2, first, the E-ECU 300 receives a water detection signal from the WIF sensor installed in the water separator and applies the received water detection signal to the V-ECU 200.

Then, the V-ECU 200 counts time starting from the time point at which the water detection signal is received by the E-ECU (S200 and S201).

Thereafter, the RPM drop request unit of the V-ECU 200 checks whether or not water drain occurs at the time point when the counted accumulated time period exceeds the preset time period (e.g., 5 min or 10 min) (S202 and S203).

As a result of the checking in step S203, if it is determined that the water drain does not occur, i.e., if the water detection signal from the WIP sensor 101 continues to be applied to the V-ECU 200, the V-ECU 200 generates the RPM drop request signal for application to the E-ECU 300 (S204).

On the other hand, if it is determined at step S203 that the water drain occurs, i.e., if the water detection signal from the WIP sensor 101 is not applied to the V-ECU 200, the V-ECU 200 defaults the RPM drop request signal but not generates the RPM drop request signal.

Meanwhile, if the RPM drop request signal from the V-ECU 200 is applied to the E-ECU 300, the E-ECU 300 primarily drops the engine RPM in response to the applied RPM drop request signal (S205).

The primary dropping of the engine RPM is performed in such a manner that a reference drop RPM is matched to the current RPM to be dropped and is stored, and when the RPM drop request signal is applied to the E-ECU, the current RPM is dropped to the reference drop RPM that is matched to the current RPM.

Next, when the primary dropping of the engine RPM is completed, a secondary dropping of the engine RPM is performed.

More specifically, first, when the accumulated time period counted at the time point when the preset time period is elapsed exceeds the preset time period (e.g., 5 min or 10 min) again, the RPM drop request unit of the V-ECU 200 checks whether or not water drain occurs (S206 and S207).

As a result of the checking in step S207, if it is determined that the water drain does not occur, i.e., if the water detection signal from the WIP sensor 101 continues to be applied to the V-ECU 200, the V-ECU 200 generates the RPM drop request signal for application to the E-ECU 300 (S208).

On the other hand, if it is determined at step S207 that the water drain occurs, i.e., if the water detection signal from the WIP sensor 101 is not applied, the V-ECU 200 defaults the RPM drop request signal but not generates the RPM drop request signal.

Meanwhile, if the RPM drop request signal from the V-ECU 200 is applied to the E-ECU 300, the E-ECU 300 secondarily drops the engine RPM in response to the applied RPM drop request signal (S209).

The secondary dropping of the engine RPM is performed in the same manner as in the primary dropping of the engine RPM.

In other words, the secondary dropping of the engine RPM is performed in such a manner that a reference drop RPM is matched to the current RPM to be dropped and is stored, and when the RPM drop request signal is applied to the E-ECU 300 including the engine RPM drop processing unit, the current RPM is dropped to the reference drop RPM that is matched to the current RPM.

As described above, in accordance with the engine protection apparatus for preventing inflow of water of the present invention, time is counted starting from the time point at which a water detection signal is received from a WIF sensor installed in a water separator, whether or not water drain occurs is checked at the time point when the counted accumulated time period exceeds a preset time period, and if the water drain does not occur, an RPM drop request signal is generated to drop the engine RPM. Furthermore, if the water drain does not occur although a signal for draining the water is received from the water detection sensor installed in the water separator, an operator recognizes the seriousness of the water separation and promptly separates the water in the water separator, so that a fatal damage which may be caused by the inflow of water into an engine in an injector or a fuel system can be prevented.

Figure 3:
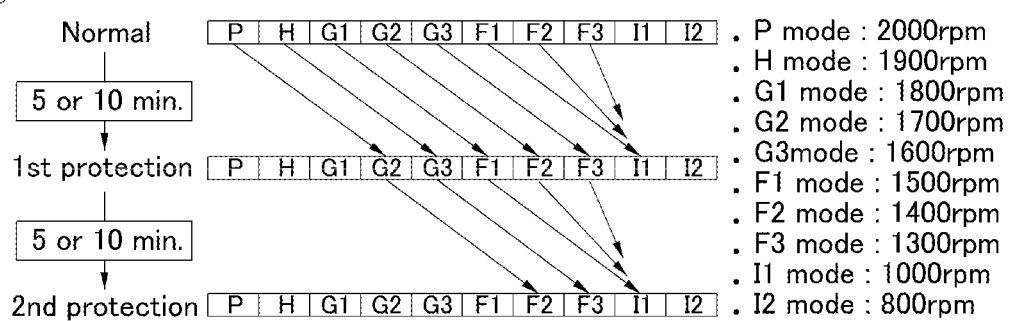
FIG. 3 is a view showing an example of a method in which the engine RPM is dropped.

FIG. 3 is a view showing an example of a method in which the engine RPM is dropped.

The method of dropping the engine RPM according to the present invention is performed in such a manner that a reference drop RPM is matched to the current RPM to be dropped and is stored, and when the RPM drop request signal is applied to the E-ECU including the engine RPM drop processing unit, the current RPM is dropped to the reference drop RPM that is matched to the current RPM.

For example, in the case where the current RPM is 2,000 rpm, the method of dropping the engine RPM is as follows.

When the accumulated time period counted starting from the time point at which the water detection signal is received exceeds the preset time period (e.g., 5 min or 10 min), if the water drain does not occur, i.e., if the water detection signal from the WIP sensor continues to be applied, the E-ECU primarily drops the current engine RPM to the reference drop RPM, i.e., 1,700 rpm that is matched to the current RPM 2,000 rpm.

Subsequently, after the primary dropping of the engine RPM is completed, if the accumulated time period counted at the time point when the preset time period is elapsed exceeds the preset time period (e.g., 5 min or 10 min) again and the water drain does not occur, i.e., if the water detection signal from the WIP sensor continues to be applied, the E-ECU secondarily drops the current engine RPM to the reference drop RPM, i.e., 1,400 rpm that is matched to the current RPM 2,000 rpm.

INDUSTRIAL APPLICABILITY

The present invention provides an engine protection apparatus for preventing inflow of water, in which time is counted from a time point at which a water detection signal is received from a WIF sensor installed in a water separator, water drain is checked at the time point where the counted time exceeds a preset time, and if the water drain does not occur, an RPM drop request signal is generated to drop the engine RPM. If the water drain does not occur although a signal for draining the water is received from the water sensor installed in the water separator, an operator recognizes the seriousness of the water separation and promptly separates the water in the water separator, so that a fatal damage which may be caused by the inflow of water into an engine in an injector or a fuel system can be prevented.

The invention claimed is:

1. An engine protection apparatus for preventing inflow of water, comprising:
   a time count unit configured to count time starting from the time point at which a water detection signal is received thereto from a WIF (Water In Fuel) sensor installed in a water separator;
   an RPM (Revolution Per Minute) drop request unit configured to check whether or not water drain occurs at the time point when the counted accumulated time period exceeds a preset time period, generate an RPM drop request signal if the water drain does not occur, and cancel the RPM drop request signal if the water drain occurs; and
   an engine RPM drop processing unit configured to drop the engine RPM in response to the generated RPM drop request signal;
   wherein the engine RPM drop processing unit assigns a predetermined reference drop RPM to a current engine RPM, and the engine RPM drop processing unit drops the current engine RPM to the reference drop RPM when the RPM drop request signal is received by the engine RPM drop processing unit.

2. The engine protection apparatus according to claim 1, wherein whether or not the water drain occurs is checked for at least two time points where the counted accumulated time period exceeds the preset time period, and if no water drain occurs, the RPM drop request unit generates the RPM drop request signal.

3. An engine protection system for preventing water inflow to an engine, the system comprising:
   a sensor configured to detect water present in a fuel-water separator, and generate a water detection signal when the sensor detects water in the fuel-water separator;
   a time counting unit configured to receive the water detection signal and measure duration of the water detection signal;
   a revolution per minute (RPM) drop request unit configured to generate an RPM drop request signal if the measured duration of the water detection signal exceeds a predetermined period of time, and configured to not generate the RPM drop request signal if the measured duration of the water detection signal does not exceed the predetermined period of time; and
   an engine RPM drop processing unit configured to reduce engine RPM from a current engine RPM to a first predetermined engine RPM upon receipt of the RPM drop request signal.

4. The engine protection system of claim 3, wherein the engine RPM drop processing unit is configured to further reduce engine RPM from the first predetermined engine RPM to a second predetermined engine RPM that is lower than the first predetermined engine RPM if the sensor continues to generate the water detection signal after the engine RPM is reduced to the first predetermined engine RPM.

* * * * *